United States Patent
Soysal et al.

(10) Patent No.: US 10,353,079 B2
(45) Date of Patent: Jul. 16, 2019

(54) PRECISE POSITIONING METHOD

(71) Applicant: STM SAVUNMA TEKNOLOJILERI MUHENDISLIK VE TICARET ANONIM SIRKETI, Ankara (TR)

(72) Inventors: Gökhan Soysal, Ankara (TR); Hülya Kurtoglu, Ankara (TR); Murat Efe, Ankara (TR); Serkan Çak, Ankara (TR); Yetkin Ersoy, Ankara (TR)

(73) Assignee: STM SAVUNMA TEKNOLOJILERI MÜHENDISLIK VE TICARET ANONIM SIRKETI, Ankara (TR)

( * ) Notice: Subject to any disclaimer, the term of this patent is extended or adjusted under 35 U.S.C. 154(b) by 134 days.

(21) Appl. No.: 15/320,145

(22) PCT Filed: Dec. 25, 2015

(86) PCT No.: PCT/TR2015/050268
§ 371 (c)(1),
(2) Date: Dec. 19, 2016

(87) PCT Pub. No.: WO2016/114732
PCT Pub. Date: Jul. 21, 2016

(65) Prior Publication Data
US 2017/0139055 A1 May 18, 2017

(30) Foreign Application Priority Data
Jan. 14, 2015 (TR) .................................. 2015 00394

(51) Int. Cl.
*G01S 13/86* (2006.01)
*G01S 13/94* (2006.01)
(Continued)

(52) U.S. Cl.
CPC .............. *G01S 19/49* (2013.01); *G01S 13/86* (2013.01); *G01S 13/94* (2013.01); *G01S 19/48* (2013.01);
(Continued)

(58) Field of Classification Search
CPC ........ G01S 5/10; G01S 13/876; G01S 13/878; G01S 5/04; G01S 13/86; G01S 13/94;
(Continued)

(56) References Cited

U.S. PATENT DOCUMENTS 6,094,607 A 7/2000 Diesel
6,157,891 A 12/2000 Lin
(Continued)

FOREIGN PATENT DOCUMENTS

EP 2244239 A2 10/2010
WO 02091014 A2 11/2002

OTHER PUBLICATIONS

International Search Report for corresponding International Application No. PCT/TR2015/050268.

*Primary Examiner* — Olumide Ajibade Akonai
(74) *Attorney, Agent, or Firm* — Egbert Law Offices, PLLC

(57) ABSTRACT

A precise positioning method provides a 3D position data in the absence of GPS by correcting the INS error, which generates a precise altitude data in the presence of GPS by integrating the outputs of all the sources providing altitude data and which generates a precise position data by using the INS/GPS integrated system position data. The method is performed by processing the data from relative sensors in the platforms comprising INS which generates the data necessary for terrain-aided navigation, radar altimeter and
(Continued)

Figure 1:
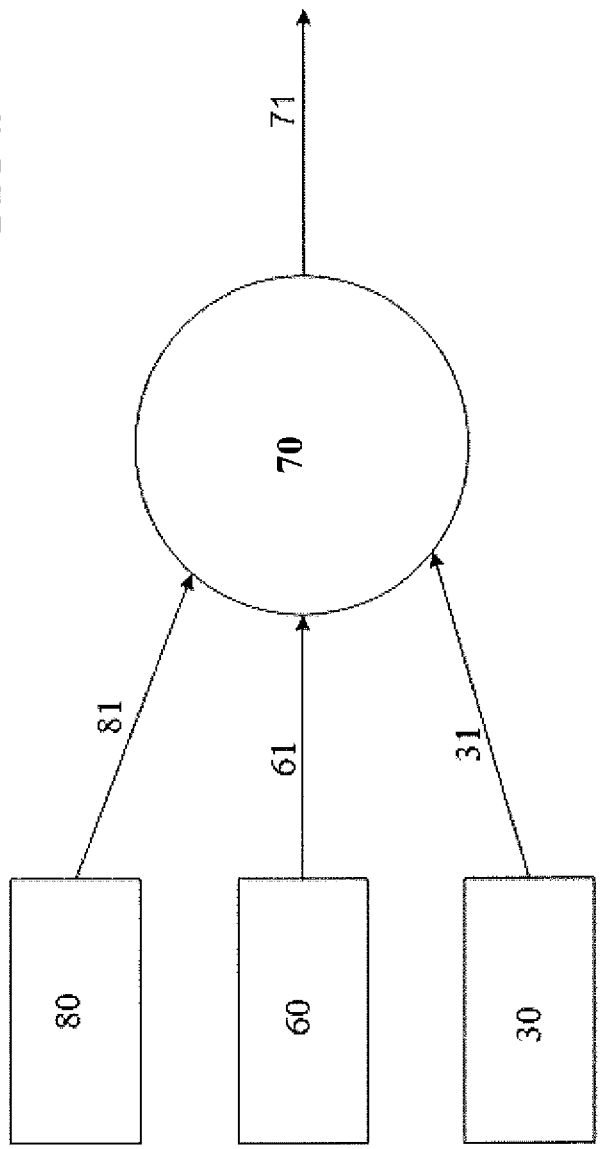

barometric altimeter sensors, and DTED which is a database comprising the elevation above sea level of the relevant terrain.

3 Claims, 2 Drawing Sheets

(51) Int. Cl.
*G01S 19/48* (2010.01)
*G01S 19/49* (2010.01)
*G01C 23/00* (2006.01)
*G01C 21/20* (2006.01)
*G01C 5/00* (2006.01)

(52) U.S. Cl.
CPC .............. *G01C 5/005* (2013.01); *G01C 21/20* (2013.01); *G01C 23/00* (2013.01)

(58) Field of Classification Search
CPC ........ G01S 13/882; G01S 19/48; G01S 19/49; G01S 13/89; G01S 13/953; G01S 19/47; G01C 5/005; G01C 23/00; B64D 45/00; G08G 5/0008; G08G 5/0021; G08G 5/0086; G08G 5/045; G08G 5/025
See application file for complete search history.

(56) References Cited

U.S. PATENT DOCUMENTS

| | | | | |
|---|---|---|---|---|
| 6,317,690 | B1* | 11/2001 | Gia | G01C 21/00 |
| | | | | 340/961 |
| 6,459,990 | B1* | 10/2002 | McCall | G01C 21/165 |
| | | | | 701/21 |
| 6,512,976 | B1* | 1/2003 | Sabatino | G01C 21/005 |
| | | | | 342/357.36 |
| 6,538,581 | B2* | 3/2003 | Cowie | G08G 5/0078 |
| | | | | 340/961 |
| 7,145,501 | B1 | 12/2006 | Manfred et al. | |
| 8,788,128 | B1* | 7/2014 | McCusker | G01S 13/882 |
| | | | | 342/120 |
| 9,187,099 | B2* | 11/2015 | Powers | B60W 40/06 |
| 9,218,741 | B2* | 12/2015 | Wu | G01S 13/876 |
| 2007/0250223 | A1* | 10/2007 | Francois | G01C 5/005 |
| | | | | 701/9 |
| 2015/0323932 | A1* | 11/2015 | Paduano | G05D 1/042 |
| | | | | 701/3 |

* cited by examiner

PRECISE POSITIONING METHOD

TECHNICAL FIELD

The invention relates to a method developed for precise positioning in navigation applications.

The invention, in addition to the basic elevation and position sources used during navigation, particularly relates to a terrain elevation data aided navigation and precise positioning method which is performed by using DTED2 data

KNOWN STATE OF ART

In today's technology, the most common positioning systems used in air, land and sea platforms are GPS and INS. Particularly GPS has become the essential of modern world by being a system which is used in variety of fields from navigation systems of all the vehicles to mobile phones, which can provide precise position data all over the world and which requires very little investment. INS is a system used in positioning, target tracking and navigation applications of air, land, sea and spacecrafts in addition to GPS hardware. The inertial sensors (gyroscope and accelerometer) of the system convert these data into instant position data by calculating the acceleration and angular velocity of the system.

Although the shot-term data precision and rapid data generating frequency of INS are very good, many errors arising from the sensors lead to unacceptable drifts in navigation data depend on time. However, in GPS measurements, the errors are independent from time. As integration of INS which provides efficient results within a short-term range and GPS which provides efficient results within a long-term range provides reliable and more correct navigation data, GPS/INS integration is preferred for applications requiring high precision. In contrast to the high cost of high precision INS systems, a low cost solution can be achieved by GPS/INS integration. However, interruptions of the satellite signal in urban, rural and indoor areas or suppression of the signal power by a jammer cause problems in INS/GPS applications and lead degradations and interruptions in the position data needed. For the cases where continuity of GPS satellite signals is interrupted, the need has arisen in order to support INS by using other methods and to correct the drift errors by using external systems.

By using these supports, an integrated navigation structure is established. In an integrated navigation system, INS measurements are used for calculating the navigation state of the system; and the support is used for correcting the navigation errors of INS by providing external measurement as is in GPS/INS integration.

One of the approaches to the integrated navigation systems is Terrain Elevation Data Aided Navigation. Terrain Elevation Data Aided Navigation is a method which tries to estimate the position of a moving vehicle by comparing the terrain profile under the vehicle and the loaded map data and corrects the INS measurements via these data in the cases where GPS is not available or cannot be used for a reason.

The application CN103439731 which was found by technical researches relates to a GPS/INS integrated navigation method based on Kalman filter. Another application CN103576178 which was found by technical researches relates to an error correction method of GPS/INS integrated navigation system in PPS satellites. However, these documents do not have a novelty aiming to remedy for the problems mentioned above.

Consequently, it is necessary to make an improvement in the related technical field because of the problems mentioned above and the inadequacy of the existing solutions for the subject.

OBJECT OF THE INVENTION

The invention, which is created by inspiring from the existing situations, aims to resolve overcome the above mentioned problems.

The initial object of the invention is to generate a 3D precise position data by integrating the data with different time and with different accuracy levels from the position and elevation data sources (INS, Radar, Altimeter, Barometric Altimeter, DTED-2) when GPS is not available for the applications (such as aircrafts) requiring precise position data.

An object of the invention is to provide more precise elevation data to the user by correcting the vertical position data in the situations where GPS is available. The invention provides generation of precise elevation data by integrating the outputs of all the sources generating elevation data and generation of precise position data by using the INS/GPS integrated system position data. The generated precise position data can be used in a variety of different applications developed for improving the situational awareness of the user, thus a more precise and accurate navigation data will be provided.

The invention improves the position precision by reducing the INS position error in the applications requiring precise position data and where GPS is not available and improves the precision of elevation data in the situations where GPS is available.

Thanks to the invention, it is possible to develop a system, which calculates the precise position by using the terrain model and the outputs of the basic avionic devices generating position and elevation data on the aircraft during flight where GPS is not available or cannot be used efficiently. Moreover, when GPS is available, by using INS and elevation data providing sensor measurements, more precise and reliable elevation data will be obtained.

Thanks to the invention, it can be provided that the flight and the critical functions thereof can continue without any interruptions in cases where the non-national system, GPS is interrupted because of terrain conditions or political reasons. Also, through the invention it is expected that the visual systems such as "Digital Map Systems" requiring precise position and elevation data may contribute to the situational awareness even in the cases where GPS is available. It is also possible to use the invention in order to improve the position precision in systems such as Obstacle Detection Systems or TAWS.

The structural and characteristic features and all of the advantages of the invention will be clearly appreciated thanks to the drawings below and the detailed description with reference to these drawings, and therefore the assessment should be performed by taking these drawings and detailed description into account.

DRAWINGS WHICH HELP UNDERSTANDING OF THE INVENTION

FIG. 1: Precise elevation data generating system

Figure 2:
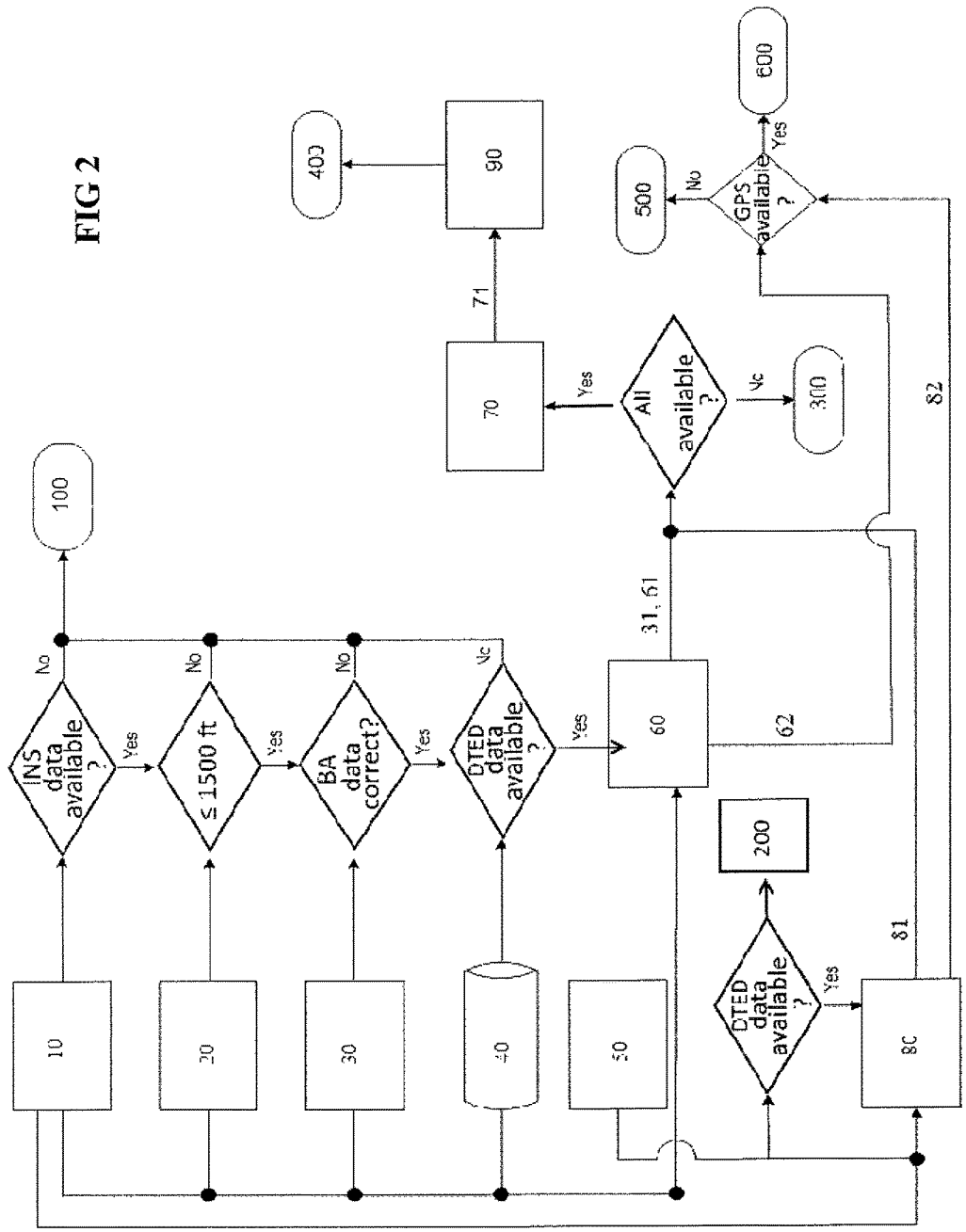

FIG. 2: Flow chart of the method of the present invention

The drawings do not need to be scaled and unnecessary details may be omitted which are not needed for the invention to be understood. Moreover, the elements which are substantially identical or which have at least substantially identical functions are denoted with the same number.

DESCRIPTION OF PART REFERENCES

10. INS
20. Radar altimeter (RA)
30. Barometric altimeter (BA)
    31. Barometric altitude data
40. Digital terrain elevation data (DTED)
50. GPS
60. Terrain aided navigation system (TANS)
    61. TANS altitude data
    62. TANS position data
70. Altitude data fusion unit (AFU)
    71. Geometric altitude
80. INS/GPS integrated system
    81. INS/GPS integrated system altitude data
    82. INS/GPS integrated system position data
90. Altitude source selection unit
100. Failure of generating output
200. Using TANS altitude data and TANS position data generated by TANS
300. Failure of data fusion
400. Deciding the data fusion result to be used as final altitude
500. Deciding the TANS position data to be the final result
600. Deciding the INS/GPS integrated system position data to be the final result
GPS: Global Positioning System
INS: Inertial Navigation System
DTED: Digital Terrain Elevation Data
TAWS: Terrain Awareness Warning System
CI: Covariance Intersection

DETAILED DESCRIPTION OF THE INVENTION

In this detailed description, the preferred embodiments of the invention are described only for better understanding of the subject and in a way that there is no limiting effect on subject.

Through the invention, the INS (10) outputs are corrected by using both digital terrain elevation data (40) and GPS (50) and precise position data is obtained to be used for different situations by receiving help from more than one source. The elevation data is also improved by using the data in the vertical channel of the INS (10) data corrected with the elevation data from different sources on the platform. Position correction works based on the digital terrain elevation data (40) (DTED) in the absence of GPS (50) and it enables the usage of GPS by the developed rule based algorithms according to the availability situation of GPS (50). The INS/GPS integrated system altitude data (81) obtained from the INS/GPS integrated system (80) is used as an input in the altitude data fusion unit (70). Another input in the altitude data fusion unit (70) is the altitude data of INS (10) improved with the terrain aided navigation system (60), namely TANS altitude data (61). These two data are fused with the barometric altitude data (31) measured by the barometric altimeter (30). The method for creating precise elevation data is shown in FIG. 1. As the elevation data (measurement) obtained from three different sources are statistically correlated and it is difficult to reveal the correlation between these measurements, the data fusion process is performed by the CI method and 3D precise position data is generated by the developed rule sets.

The components and functions thereof used in the method for obtaining 3D precise position data are as follows:

INS (10), radar altimeter (20), barometric altimeter (30) are the sensors which generates the necessary data for terrain aided navigation.

Digital terrain elevation data (40) is the database comprising the elevation above sea level of the relevant terrain in the region for terrain aided navigation.

GPS (50) is a satellite based navigation system. It is used for correction of INS (10) error.

INS/GPS integrated system (80) is used for correction of INS (10) error in the presence of GPS (50) signal.

Terrain aided navigation system (60) is used for correction of INS (10) error by using the digital terrain elevation data (40) according to the availability of the sensors which creates input it.

Altitude data fusion unit (70) is used for fusion of the altitude data from terrain aided navigation system (60), INS/GPS integrated system (80) and barometric altimeter (30).

Altitude source selection unit (90) decides the final altitude data to be used by obtaining the geometric altitude (71) data from the altitude data fusion unit (70).

A precise positioning method which is performed by processing the data from relevant sensors in order to be used in applications providing precise altitude and position data in the platforms having INS (10), GPS (50), radar altimeter (20), barometric altimeter (30) and DTED (40); comprises the following process steps:

periodically controlling whether the INS (10), radar altimeter (20), barometric altimeter (30), DTED (40) data provide the necessary conditions or not, the conditions are as follows:
  controlling the presence of barometric altimeter (30) measurements and calibration state,
  controlling whether the radar altimeter (20) measurements are below 1500 ft.,
  controlling the presence of INS (10) output,
  controlling the presence of the digital terrain elevation data (40) for the relevant position.

If all the INS (10), radar altimeter (20), barometric altimeter (30), DTED (40) data are available and they provide the necessary conditions for the method to be performed;
  a. generating TANS altitude data (61) and TANS position data (62) by using the DTED (40), INS (10), radar and barometric altimeter (20, 30) measurements by TANS (60) via a non-linear filtering method,
  b. sending the TANS altitude data (61) generated by TANS (60) to the altitude data fusion unit (70),
  c. sending the measurement data provided by barometric altimeter (30) to the altitude data fusion unit (70) for being processed, failure of generating (100) the system output, unless all the INS (10), radar altimeter (20), barometric altimeter (30), DTED (40) data are available or unless said values provide the necessary conditions for the method to be performed, controlling the presence of GPS (50) data,
  a. If INS (10) and GPS (50) data are available; sending the INS/GPS integrated system altitude data (81) by the INS/GPS integrated system (80) to the altitude data fusion unit (70) for being processed,
  b. Unless INS (10) and GPS (50) data are available, using (200) the TANS altitude data (61) and TANS position data (62) generated only by TANS (60).

controlling the presence of GPS (50)
a. Unless GPS (50) is available; deciding (500) that the TANS position data (62) is the final result,
b. If GPS (50) is available, deciding (600) that corrected INS/GPS integrated system position data (82) obtained by the INS/GPS integrated system (80) is the final result.

If TANS altitude data (61) generated by TANS (60), the INS/GPS integrated system altitude data (81) generated by the INS/GPS integrated system (80) and all data generated by the barometric altimeter (30) are available:
a. obtaining the geometric altitude (71) data via CI method by integrating the data sent to the altitude data fusion unit (70),
b. after the fusion process, calculating the altitude value with minimum variance among TANS altitude data (61), INS/GPS integrated system altitude data (81), barometric altitude data (31) and geometric altitude (71) in the altitude source selection unit (90).
c. deciding (400) for using the data fusion result calculated in the altitude source selection unit (90) as the final altitude, failure of data fusion (300), unless TANS altitude data (61) generated by TANS (60), the INS/GPS integrated system altitude data (81) generated by the INS/GPS integrated system (80) and all data generated by the barometric altimeter (30) are available.

FIG. 2 shows the flow chart of the method of the present invention which is mentioned in the process steps. In said terrain aided navigation system (60), the INS (10) position data is corrected via the non-linear filtering method by using the calibrated barometric altimeter (30) measurements, DTED (40) measurements and radar altimeter (20) measurements up to 1500 ft. In order for the terrain aided navigation system (60) to provide results, the calibration status of barometric altimeter (30) measurements, the fact that the measurements of radar altimeter (20) are below 1500 ft., presence of INS (10) output and digital terrain elevation data (40) are controlled.

TANS altitude data (61), INS/GPS integrated system altitude data (81) and barometric altitude data (31) are used for generating geometric altitude data. One of the reasons for using said CI method is the statistical correlation between the TANS altitude data (61) and barometric altitude data (31).

The invention claimed is:

1. A precise positioning method for a platform having an Inertial Navigation System (INS) that generates data necessary for terrain-aided navigation, the platform having a radar altimeter and barometric altimeter sensors and Digital Terrain Elevation Data (DTED), the DTED providing an elevation above sea level of a relevant terrain, the precise positioning method comprising:
providing a three-dimensional position data in an absence of Global Positioning System (GPS) data by correcting an INS error;
generating a precise altitude data in a presence of GPS by integrating outputs of all sources providing altitude data so as to generate a precise position data by using an integrated INS and GPS position data;
processing data from the INS, the radar altimeter and barometric altimeter sensors and the DTED;
periodically controlling whether the INS, the radar altimeter and barometric altimeter sensor data, and the DTED data provide the necessary conditions or not, the step of periodically controlling comprising:
controlling a presence and calibration state of the barometric altimeter sensor measurements;
controlling whether the radar altimeter sensor is below 1500 feet;
controlling a presence of an output of the INS; and
controlling a presence of the DTED data for the relevant position;
generating a Terrain Aided Navigation System (TANS) altitude data and a TANS position data by using the DTED, the INS data, the radar and barometric altimeter sensor data by the TANS if all the INS data, the radar and barometric altimeter sensor data and the DTED data are available, the step of generating comprising:
sending the TANS altitude data generated by the TANS to an altitude data fusion unit; and
sending the data provided by the barometric altimeter sensor to the altitude data fusion unit for processing;
controlling a presence of GPS and INS data if INS data and GPS data are available, the step of controlling comprising:
sending the INS and GPS integrated outputs to the altitude data fusion unit for processing;
deciding whether the processed INS and GPS integrated outputs is the final result;
using the TANS altitude data and the TANS position data generated only by the TANS if the INS data and the GPS data are not available and then deciding if the TANS position data is the final result;
obtaining a geometric altitude data by integrating the data sent to the altitude data fusion unit if the TANS altitude data generated by the TANS and if the integrated outputs of the INS and GPS and if the data generated by the barometric altimeter sensor are available and calculating an altitude value after the data fusion unit fuses the data among the TANS altitude data, the integrated outputs of the INS and GPS, the barometric altitude data and the geometric altitude data in an altitude source selection unit; and
deciding if the altitude value from the altitude source selection unit is the final altitude.

2. The process positioning method of claim 1, further comprising:
generating the TANS altitude data and the TANS position data by TANS via a non-linear filtering method by using the DTED, the INS data and the radar and barometric altimeter sensor measurements.

3. The process positioning method of claim 1, wherein the geometric altitude data is obtained by fusing the data sent to the altitude data fusion unit via a covariance intersection method.

* * * * *